Inventors.
Frank W. Wendelburg
Erwin C. Brekelbaum
By David A. Fix
Attorney

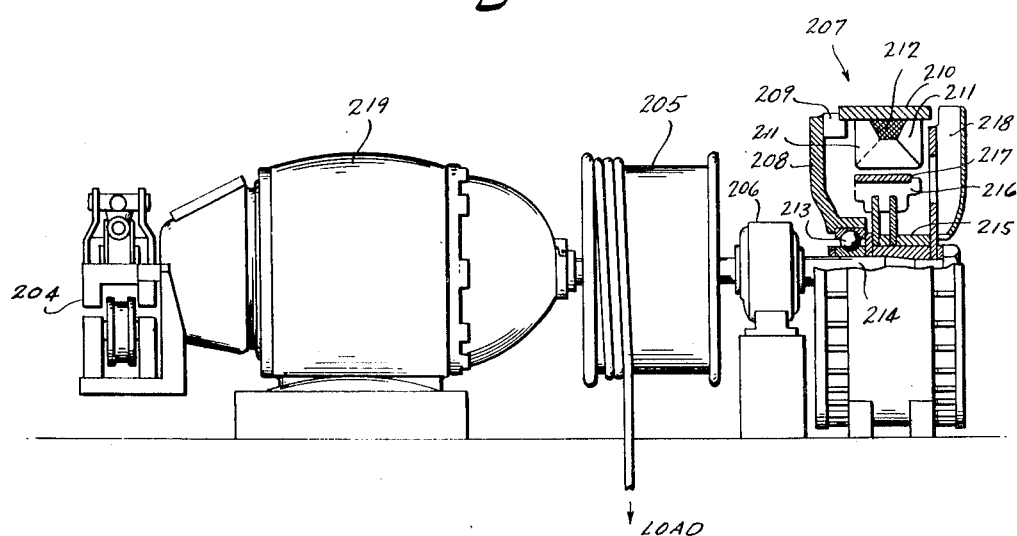
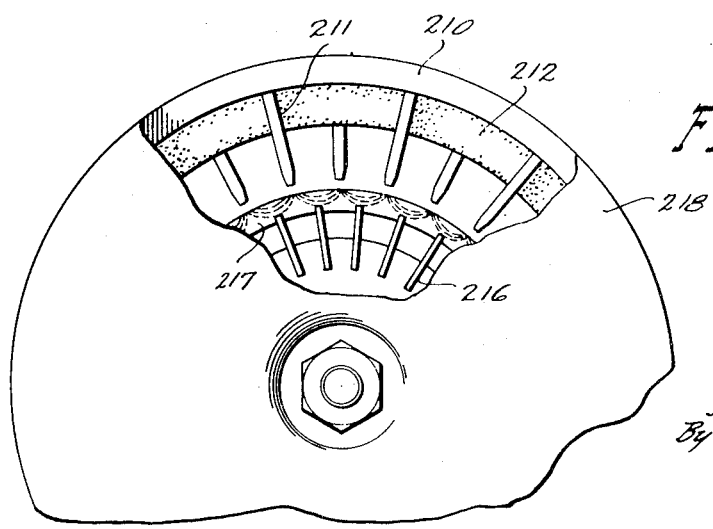

Patented Jan. 3, 1950

2,493,607

UNITED STATES PATENT OFFICE 2,493,607

EDDY CURRENT PRELOADED CONTROLLABLE SPEED MOTOR

Frank W. Wendelburg and Erwin C. Brekelbaum, Milwaukee, Wis., assignors to Harnischfeger Corporation, Milwaukee, Wis., a corporation of Wisconsin Application October 30, 1947, Serial No. 782,998

12 Claims. (Cl. 318—209)

This invention relates to speed controlling means for alternating current motors, more particularly to an apparatus adapted to regulate and vary the speed of an induction motor subjected to variable loads including overhauling loads and resides in an apparatus in which an alternating current motor, with means for selectively varying the input thereto, is so coupled with means depending upon eddy-current induced opposing torque that any selected speed of the motor in either direction of rotation will remain comparatively constant regardless of load variation including the imposition of overhauling loads.

In hoists and cranes which impose overhauling loads the use of direct current driving machinery has long been preferred particularly where wide variation in the load to be handled is involved. This preference has been based upon the fact that direct current equipment may be constructed in such a way that the direction of movement of the load and its rate of travel both during lifting and lowering may be forecast by an operator even though the weight of the load be unknown. These desirable properties of direct current equipment are dependent in part on the advantageous characteristics of so-called dynamic braking and in part upon the ease of providing comparatively "flat" speed torque characteristics in direct current motors. In the case of alternating current driven hoists and the like dynamic braking is not possible at speeds less than the synchronous speed of the motor. Furthermore, in alternating current equipment the torque exerted by the motor varies markedly with changes in speed with the result that it is difficult to forecast the rate and even direction of movement of loads of unknown weight.

Numerous efforts have been made to provide control systems which may be used in conjunction with alternating current induction motors for the purpose of causing them to respond more nearly in the manner of direct current equipment. Some of these approximate the performance desired to a considerable degree but the apparatus required for the purpose is elaborate and expensive and often requires considerable maintenance.

In accordance with this invention an induction motor is provided with means for selectively varying the input thereto, for example, as by varying the secondary resistance of a wound rotor motor or by adjustment of input voltage or phase relationship in a squirrel cage or wound rotor motor and there is placed in driven relationship with the shaft of the motor eddy-current torque-resisting means in which localized areas of magnetic flux are caused to sweep through a magnetic material thus giving rise to eddy-currents which resist the rotation of the motor shaft when excitation current regulated in keeping with the input to the motor is applied. With these elements thus interrelated the net characteristics of the motor when operating with any given input are rendered such that the rate of speed of the motor will remain comparatively constant whether the torque demand be light or heavy. This result follows since the drag of the eddy-current torque resisting means diminishes as motor speed diminishes and increases as motor speed increases which properties are the inverse of the speed torque properties of the motor itself. The same or a similar result follows but at different speeds when different inputs to the motor and different degrees of excitation of the eddy-current torque-resisting means are applied and also when the motor is reversed and the apparatus is employed for lowering a load.

The manner in which the above results and advantages of this invention are obtained will become apparent from the description following which is set forth by way of illustration and not of limitation reference being had to the accompanying drawings which form a part hereof.

In the drawings:

Fig. 3 is a side view partly in section of an eddy-current torque resisting means mechanically connected with the shaft of a motor in accordance with this invention; and Fig. 4 is a fragmentary detail end view partly broken away of the eddy-current torque resisting means shown in Fig. 3.

Figure 1:
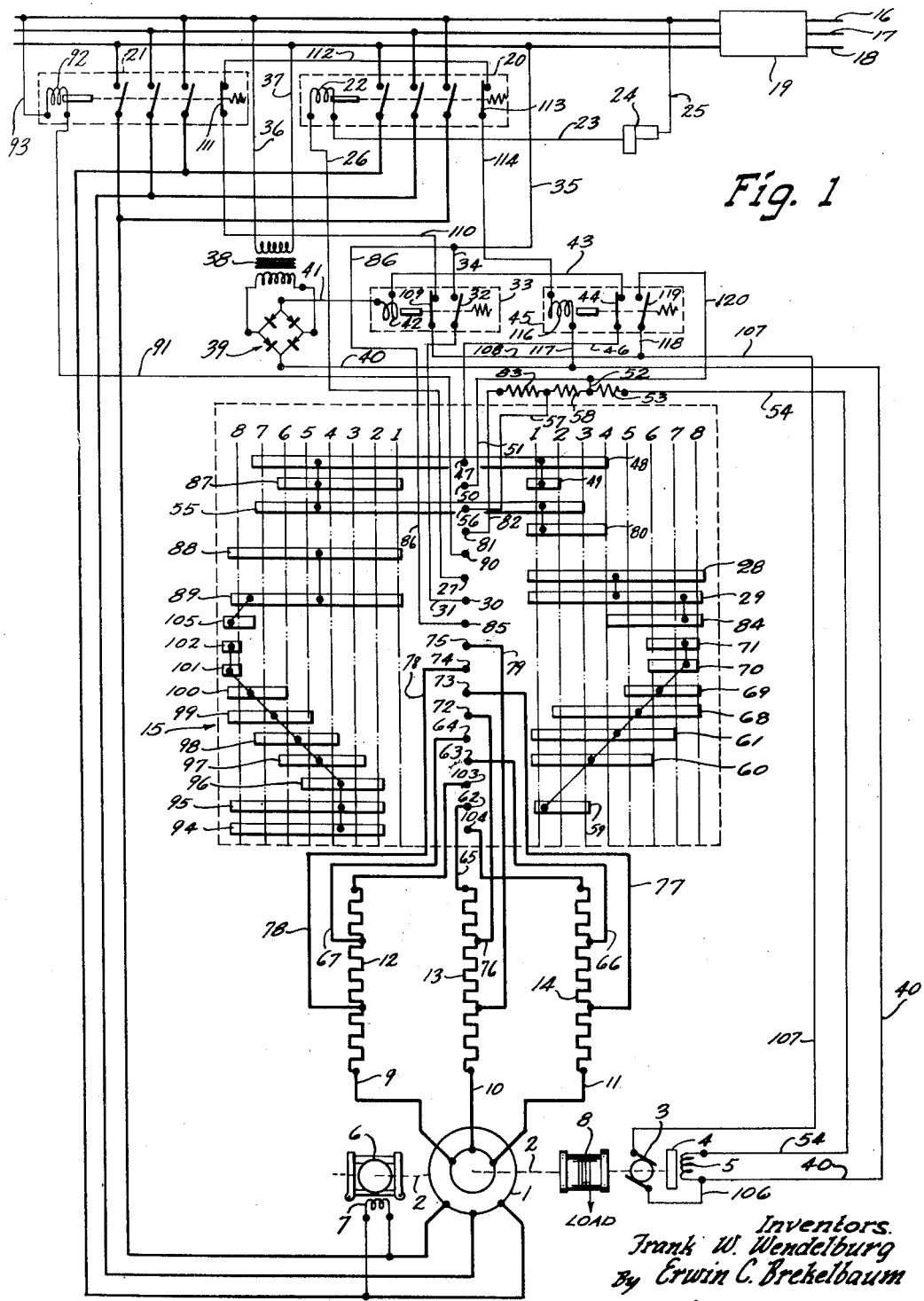
Fig. 1 is a circuit diagram of one form of the apparatus of this invention.

In the form of apparatus of this invention diagrammatically shown in Fig. 1 a wound rotor induction motor 1 of conventional form is employed. Mechanically connected to the shaft 2 of motor 1 and to the right of the same is a generator 3 the purpose of which will be more fully described hereinafter. On a further extension of the shaft 2 and to the right of generator 3 there is mounted an eddy-current torque resisting means or brake 4 having an exciting winding 5. The manner of functioning and the construction of the eddy-current torque-resisting means 4 will be described more in detail hereinafter.

The shaft 2 of the motor 1 extends also to the left and is engaged by a mechanical brake 6 adapted to be released by the supplying of current to a magnet winding 7. The brake 6 is of conventional construction such as is commonly employed for the stopping and holding of motors when power is not being supplied thereto and is, therefore, not described in detail herein. To the right of the motor 1 there is diagrammatically indicated a hoisting drum 8 upon which a line sustaining a load is wound.

Connected to the secondary of motor 2 by leads 9, 10 and 11 are external resistance grids 12, 13 and 14 which are tapped in conventional manner with leads from said taps being extended to fingers of a conventional drum type controller contained within the rectangle 15.

Power for the operation of the motor 1 is supplied from a source 16, 17 and 18 which extends through a disconnect switch 19 to the terminals of a hoisting contactor 20 and in similar manner to the terminals of a lowering contactor 21. For causing the hoisting contactor to be closed a winding 22 is provided which is connected on the one hand through lead 23, limit switch 24 and lead 25 with the source lead 16. On the other hand, the winding 22 of contactor 20 is connected through a lead 26 with a finger 27 of the controller 15. When the controller 15 is moved to the first hoisting position finger 27 engages segment 28 which through connection with segment 29 joins finger 27 electrically to finger 30. Finger 30 is connected in turn through lead 31 with normally open contact 32 of current relay 33. Under normal conditions for reasons which will be later explained contact 32 will be found closed and the circuit therefor extends thence through leads 34 and 35 back to the source lead 18.

Whenever disconnecting switch 19 is closed, power is supplied through leads 36 and 37 to a transformer 38 which supplies current to a fullwave dry-disc rectifier 39. The output of the rectifier 39 is carried by lead 40 on the one hand to one terminal of the winding 5 of the eddy-current torque resisting means 4. The output of the rectifier 39 is carried on the other hand through lead 41 to coil 42 of current relay 33. The opposite terminal of coil 42 is connected by a lead 43 with a normally closed contact 44 of a power failure relay 45. From contact 44 the output of the rectifier 39 is extended by a lead 46 to finger 47 of controller 15. With the controller 15 in the previously described first hoisting position, segments 48 and 49 join lead 46 through finger 50 to lead 51 which is connected in turn through lead 52, resistor 53 and lead 54 with the opposite side of winding 5 of the eddy-current brake 4 producing maximum excitation thereof.

With the controller 15 in the off position as shown in Fig. 1 lead 46 is connected to segment 48 and thence to segment 55. Finger 56 also remains in contact with segment 55 and the latter is joined by lead 57 and resistor 58 with lead 54 causing a moderated current to flow in winding 5 of eddy-current brake 4. This current and the augmented current which results by movement of the controller to the first hoist position both are sufficient to excite winding 42 to the point where current relay 33 moves to the position opposite that shown in Fig. 1. Closing of the disconnect switch 19, therefore, places the apparatus in condition where movement of the controller into any of the hoist positions immediately energizes coil 22 in the hoist contactor 20.

Movement of the controller 15 into the first hoist position also brings segments 59, 60 and 61 into contact respectively with fingers 62, 63 and 64 thus closing the secondary resistor grids 12, 13 and 14 through leads 65, 66 and 67 in such manner as to complete the secondary circuit of motor 1 with substantial resistance contained therein. Motor 1 under these conditions will accelerate in a forward direction causing the load to be raised. Speed increases until the torque output of motor 1 falls to the point where it is equal to the torque imposed by the load plus the resisting torque imposed by the eddy-current torque resisting means 4. Thereafter the load will continue to raise at a steady speed. If the load be heavy, the steady speed attained will be somewhat lower than that attained if the load be light. However, due to the properties of the eddy-current resisting means 4 this difference has been found to be not to exceed more than a small fraction of the full rated speed of motor 1.

By movement of the controller 15 into the succeeding hoisting positions indicated, the secondary resistance of motor 1 is progressively diminished through engagement of segments 68, 69, 70 and 71 with fingers 72, 73, 74 and 75 which are joined in turn through leads 76, 77, 78 and 79 with the grids 12, 13 and 14 as shown.

As succeeding hoisting positions are racked up on the controller excitation of winding 5 of eddy-current resisting means 4 are accordingly modified. For example, in hoisting position 3 the output of rectifier 39 becomes supplied through lead 57 and resistance 58 thus reducing the excitation of winding 5 and imposing a somewhat smaller opposing torque on the motor 1, thus giving rise to an increased hoisting speed even though the secondary resistance of motor 1 remains unchanged.

In the fourth position of controller 15 excitation current supplied to eddy-current resisting means 4 is dependent upon contact of the segment 80 with finger 81 which joins through lead 82 with resistance 83 thus further reducing the excitation furnished to the winding 5 of the eddy-current resistance means 4.

In all hoisting positions of controller 15 beyond the fourth hoisting position, excitation of the winding 5 of eddy-current resisting means 4 is terminated. When this occurs current relay 33 returns to the position shown in Fig. 1 thus interrupting the circuit upon which maintenance of the winding 22 of hoisting contactor 20 has heretofore been dependent. Under these circumstances, however, controller segment 84 comes in contact with finger 85 and thus through lead 86 maintains contact with lead 35 and supply lead 18.

When lowering of the load is required assuming controller 15 to be in the off position shown, motor 1 is stationary, brake 6 is set and power is cut off the motor 1. Winding 5 of eddy-current resisting means 4, however, is excited moderately as heretofore described by reason of the segments 48 and 55 which remain continuously in contact with fingers 47 and 56 when the controller is in off position. Movement of the controller to the first lowering position brings segment 87 in contact with finger 50 thus furnishing maximum excitation current to the eddy-current resisting means. At the same time segments 88 and 89 through engagement with fingers 90 and 30 complete a circuit from supply lead 18 through leads 35 and 34, contact 32, lead 31, finger 30, finger 90 and lead 91 with winding 92 of hoisting contactor 20. Hoisting contactor winding 92 is connected in turn through lead 93 with source lead 16 as shown. Motor 1, however, in the first lowering position of controller 15 exerts no lowering torque since the secondary thereof remains entirely unconnected. The load, however, may descend since brake 6 becomes released upon the closing of lowering contactor 21. In succeeding lowering positions of controller 15 through engagement of segments 94, 95, 96, 97, 98, 99, 100, 101 and 102 with corresponding controller fingers including fingers 103 and 104 not heretofore described causes motor 1 to apply reverse torque, that is to say, torque in the same direction as that exerted by the load in varying amount in addition to the torque imposed by the load; thus making available increased lowering speeds on this account.

In addition upon reaching lowering position 7 excitation of winding 5 of eddy-current resisting means 4 becomes diminished by reason of disengagement of segment 87 from finger 50 and in lowering position 8 excitation of winding 5 is terminated by reason of disengagement of segments 48 and 55 from fingers 47 and 56. At the same time segment 105 comes into contact with finger 85 to preserve current in winding 92 of lowering contactor 21 upon the opening of current relay 33.

During lowering, augmented reverse torque due to a heavy load becomes offset by a slight increase of speed causing the resisting torque of the eddy-current torque resisting means 4 to increase accordingly. In any position of the controller during lowering, increase of speed produced by increasing the load from zero to maximum load produces a change not exceeding a small fraction of full rated speed under no load conditions of motor 1.

Inasmuch as control of the lowering of the load with the apparatus of this invention is accomplished without resort to the use of "plugging" counter-torque, exerted by motor 1, there is no danger that a light load may be lifted instead of lowered by movement of the controller into any lowering position. Lowering of an empty hook or a very light load is, therefore, positive. Also by reason of continuous excitation of the torque resisting means 4 in the off position, momentary jerking of the load is avoided upon racking of the controller 15 to and from off position before or after either hoisting or lowering.

In order to overcome the difficulty which might arise through power failure with brake 6 defective or other mechanical derangement such as a broken motor shaft existing and with a load in hoisted position, generator 3 previously referred to is provided. Generator 3 is self excited and thus unaffected by power failure and is connected on the one hand through lead 106 with winding 5 of eddy-current torque resisting means 4 and on the other hand through lead 107 and 108 with the normally closed contact 109 of current relay 33. With no power available rectifier 39 will have no output and the contact 109 above referred to will be in closed position as shown in Fig. 1. Continuing from contact 109 through lead 110 and normally closed lock-out contact 111, lead 112 and normally closed lock-out contact 113 generator 3 is joined by lead 114 to winding 116 of power failure relay 45. Winding 116 is connected in turn through lead 117 to lead 40 and thence to the opposite side of generator 3.

Power failure alone normally cannot give rise to a hazardous condition since brake 6 when in good condition will hold whatever load has been hoisted. However, since brake 6 is a friction device and may become worn or failure of some other mechanical part may occur and this condition may not be discovered until power failure occurs, a hazardous condition could result which might cause a precipitate descent of the load. This condition, however, will not occur with the apparatus of this invention since acceleration of motor 1 by the descending load will cause generator 3 acting through the circuit above described to cause closing of power failure relay 45 thus establishing a circuit from generator 3 through lead 107, lead 118, contact 119, lead 120 to lead 52 and thence through resistance 53 and lead 54 to the winding 5 of the eddy-current resisting means 4, which is connected as already described through lead 106 to the opposite side of generator 3. Excitation current is thus supplied in amount sufficient to cause a very slow descent of the load even though it be very heavy.

This emergency restraint will go into operation regardless of the position of the controller 15. That is to say, the automatic restraint will become operative when the controller is in any of the hoisting or lowering positions as well as in the off position. This is in contrast with the properties of the usual direct current dynamic-braking type of hoist control in which emergency restraint of lowering, in case of power failure, coincident with a mechanical derangement, depends upon maintenance of the controller in either the "off" position or in one of the lowering positions. If a person operating such a system in the excitement of an emergency places the controller in one of the hoisting positions, disastrous dropping of the load will result. This hazard is avoided in the apparatus of this invention since the power failure relay 45 will close whenever generator 3 is being driven and a power failure occurs causing current relay 33 to open which actions are independent of the position of controller 15.

If desired an accumulator or other standby source of excitation current equivalent to the generator 3 may be substituted for the generator 3. In case an accumulator is used the same may be arranged to be recharged by the rectifier 39.

Where emergency restraint of the type above referred to is not required the generator 3 and relays 33 and 45 may obviously be dispensed with. Also if desired, generator 3 may be retained and rectifier 39 may be dispensed with. Where a generator such as generator 3 is employed as a source of excitation current, better speed regulation by the eddy-current torque resisting means 4 may be obtained because of changes in excitation current caused by changes in speed of the generator.

In the event a motor of large size is employed, the circuit of this invention may be so constructed that a light drum controller or selector switch may be employed and all load currents may be handled through magnetic contactors. The apparatus of this invention when thus constructed may take the form illustrated in Fig. 2.

Figure 2:
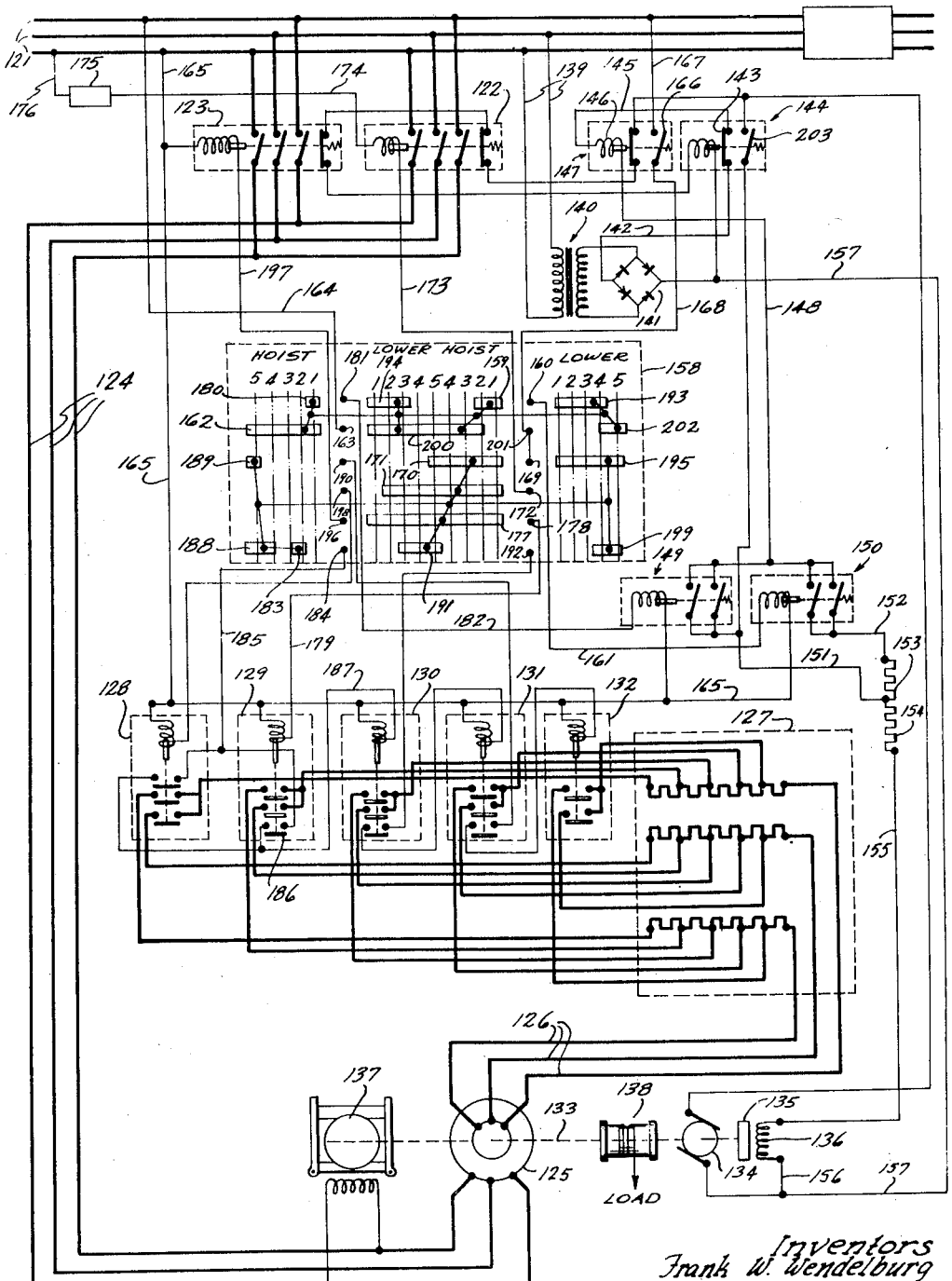
Fig. 2 is a circuit diagram of another form of the apparatus of this invention.

As shown in Fig. 2 the apparatus derives its power from a source 121 which is connected through hoist contactor 122 and lowering contactor 123 with the power leads 124 of the motor 125 in such manner that forward and reverse driving of the motor 125 may be obtained. The secondary of motor 125 is connected through leads 126 with a resistor grid arrangement of conventional form shown enclosed within the dotted rectangle 127. The resistor grid is connected through leads as shown with magnetic contactor switches 128, 129, 130, 131 and 132, the latter serving upon being closed to selectively vary the external resistance of the secondary of motor 125.

Mounted upon the shaft 133 of motor 125 are a self excited generator 134 and an eddy-current torque resisting means 135 having a winding 136. To the left of motor 125 and also mounted on the shaft 133 is a magnetically released mechanical brake 137. Means for imposing an overhauling load in the form of a hoisting drum 138 is also mounted on the shaft 133 as shown.

Connected to the source 121 through leads 139 and transformer 140 is a rectifier 141 for furnishing the normal excitation current of the winding 136 of the eddy-current torque resisting means 135. The output of rectifier 141 is connected through lead 142 with the normally closed contact 143 of a power failure relay 144 and thence through lead 145 with the coil 146 of current relay 147. From coil 146 lead 148 extends to the normally open contacts of excitation relays 149 and 150 as shown. Through leads 151 and 152 and through resistances 153 and 154 the circuit is extended through lead 155 to one terminal of winding 136. The opposite terminal of winding 136 is connected through lead 156 and lead 157 back to the rectifier 141. In this way excitation current is furnished to the winding 136 upon closure of either excitation relay 149 or 150. Such excitation current is of a smaller value when the contactor 150 only is closed. When the contactor 149 is closed excitation current is increased by reason of reduced resistance in the circuit.

For the purpose of controlling the opening and closing of excitation relays 149 and 150 and for selection of predetermined resistances in grid 127, a drum controller 158 is provided. When controller 158 is moved to the first hoist position, engagement of segment 159 with finger 160 establishes connection between the winding of excitation relay 150, through lead 161 with segment 162 and thence through finger 163 and lead 164 with a direct connection to power source 121. The opposite side of the winding of excitation relay 150 is connected through lead 165 also with current source 121 causing relay 150 to close thus establishing current in the winding of current relay 147.

At the same time engagement of segment 180 with finger 181 causes closure of excitation relay 149 by reason of lead 182 which is connected therewith. This causes closure of normally open contact 166 of current relay 147 thus providing a path through leads 167, 168, finger 169, segment 170, segment 171, finger 172 and lead 173 to the winding of hoist contactor 122. The winding of hoist contactor 122 is connected in turn through lead 174, limit switch 175 and lead 176 to the current source 121 thus causing hoist contactor 122 to close. At the same time segment 177 by engaging finger 178 completes a current path through the winding of resistance contactor 129 which passes from the current source 121 through lead 165 and thence from the winding of contactor 129 through lead 179 to the finger 178. From the finger 178 the circuit passes through segment 177, segment 170, finger 169, lead 168, contact 166 and lead 167 back to the current source 121.

There is thus established a pre-determined resistance in the secondary of motor 125 and a pre-determined excitation of eddy current torque resisting means 135 and the motor 125 moves in a hoisting direction.

Upon movement of controller 158 to the second hoisting position segment 180 disengages from finger 181 thus interrupting current to the winding of excitation relay 149 reducing the current in the eddy-current torque resisting means 135. This permits motor 125 to operate at increased speed. At the same time segment 183 engages finger 184 thus completing a circuit extending from the current source 121 to the contact 166 and leads previously described to the lead 185 and lock-in contact 186 of resistance contactor 129 to lead 187 which joins with the coil of resistance contactor 130 causing the same to close. In this way secondary resistance of motor 125 is further reduced contributing also to increased speed of motor 125.

In the third hoisting position of controller 158 segment 159 leaves the finger 160 thus de-energizing the eddy-current torque resisting means 135. At the same time segment 183 leaves the finger 184 causing resistance contactor 130 to open. With the complete absence of resisting torque on the part of eddy-current torque resisting means 135, motor 125 increases its speed even though secondary resistance is somewhat diminished.

In the fourth hoisting position of controller 158 segment 188 engages finger 184 and, all other conditions remaining constant, closure of resistance contactor 130 again takes place causing further increase in speed of motor 125.

In the fifth hoisting position of controller 158 segment 189 comes in contact with finger 190 and segment 191 comes in contact with finger 192. As a result resistance contactors 131 and 132 are closed reducing secondary resistance in motor 125 to a minimum to cause the motor to operate at maximum speed.

When controller 158 is moved in the lowering direction, into its first position, segments 193 and 194 by engagement with fingers 160 and 181 cause maximum excitation of the eddy-current torque resisting means 135. At the same time engagement of segment 195 with finger 169 and segment 177 with finger 196 completes a circuit through lead 197 and through the winding of lowering contactor 123 which is joined with the current source 121 through lead 165. Power for release of brake 137 is thus furnished but by reason of the open condition of the secondary circuit of motor 125 no torque is exerted thereby and lowering of the load is entirely under control of the eddy-current torque resisting means 135.

Movement of controller 158 into the second lowering position brings segment 171 into contact with finger 198 thus causing resistance contactor 128 to close and causing motor 125 to exert a small amount of torque to augment that contributed by the load and thus to overcome the torque resisting means 135 at a higher rate of speed.

Movement of controller 158 into the third lowering position brings segment 191 into contact with finger 184 causing resistance contactor 130 to close thus further augmenting the reverse torque of motor 125 causing an increased lowering speed.

Movement of the controller 158 into the fourth lowering position causes the segment 194 to leave the finger 181 and brings the segment 199 into contact with finger 192. Thus excitation of the eddy-current torque resisting means 135 is diminished and secondary resistance of the motor 125 diminished through closure of resistance contactor 131. An increased rate of lowering speed, therefore, results.

Movement of controller 158 into the fifth lowering position causes segment 193 to leave the finger 160 thus discontinuing excitation of the eddy-current torque resisting means 135. At the same time segment 170 is brought in contact with finger 190 thus closing resistance contactor 132 and reducing external resistance in the secondary of motor 125 to a minimum. Maximum lowering speed, therefore, results and braking action then becomes dependent upon regenerative braking speeds in excess of synchronous speed of the motor 125.

During high speed hoisting and lowering under which conditions the eddy-current torque resisting means 135 is not excited, maintenance of the closure of the hoist contactor 122 and the lowering contactor 123 is brought about by engagement respectively of segment 200 with the finger 201 or the engagement of segment 202 with the finger 201.

In the case of power failure under conditions where mechanical brake 137 has been disabled, or other mechanical derangement has occurred, safe lowering will, nevertheless, result by reason of the action of generator 134 which becomes connected to winding 136 through normally open contact 203 of power failure relay 144. Closure of power failure relay 144 occurs whenever hoisting and lowering contactors 122 and 123 are both in open position and current relay 147 is de-energized providing, of course, that generator 134 is being driven. Thus the load is lowered at a safe speed even though power at the source 121 has failed and the brake 137 has suffered damage to the point where it is not capable of holding the load against descent or some other mechanical derangement has occurred.

If desired as in the case of the apparatus shown in Fig. 1 the apparatus shown in Fig. 2 may be so arranged as to maintain excitation of the eddy-current torque resisting means 135 while the controller 158 is in off position. For this purpose it is necessary only to merge the controller segments 159 and 193 so that they remain continuously in engagement with finger 75 and to merge the segments 162 and 200 so that they remain continuously in engagement with finger 163. As explained earlier pre-excitation of eddy-current torque resisting means 135 gives the operator an improved command of the load at the moment when the controller is shifted to and from the off position from either hoisting or lowering positions.

While eddy-current torque resisting means are old and well known and the details of construction of the same form no part of this invention there is set forth in Fig. 3 in simplified diagrammatic form one embodiment of an apparatus of this type suitable for use with this invention.

As shown in Fig. 3 motor 219 is provided corresponding with the motor 1 in Fig. 1 or the motor 125 in Fig. 2. Mounted upon the frame of the motor 219 is a magnetically released mechanical brake 204 corresponding with the brake 6 in Fig. 1 or the brake 137 in Fig. 2. To the right of motor 219 and illustrative of a means imposing an overhauling load is a drum 205 corresponding with the drum 8 in Fig. 1 and the drum 138 in Fig. 2. Drum 205 is representative only of a typical load since it is obvious that the motor 219 may be connected through gearing or otherwise to any type of load desired.

To the right of drum 205 is a generator 206 the same corresponding with the generator 3 shown in Fig. 1 or the generator 134 shown in Fig. 2.

To the right of generator 206 is an eddy-current torque resisting means designated generally by the numeral 207. In the form shown in Fig. 3 and in greater detail in Fig. 4 the torque resisting means 207 is made up of a stationary frame formed of an end plate 208 joined by means of spaced vanes 209 with a stationary field ring 210. These parts are preferably integrally joined by welding or by casting in one piece and form the stationary frame of the torque resisting means 207. Extending inwardly from field ring 210 is a plurality of spaced magnetic fingers or poles 211 so shaped as to provide an annular passage within which excitation toroidal winding 212 is received.

In the center of stationary end plate 208 is mounted a bearing 213 upon which shaft 214 is rotatably carried. Secured to the shaft 214 to rotate therewith as shown is a hub 215 to which there is secured a plurality of circumferentially spaced radially disposed cooling vanes 216 which merge at their outer limits with a continuous band of magnetic material 217 within which eddy-currents are created when relative motion between the band 217 and the fingers 211 takes place with excitation current flowing in the winding 212. The use of short circuited conductor bars embedded within the band 217 to facilitate formation of eddy currents is not necessary but such may be resorted to if desired. Also secured to the shaft 214 to rotate with it is a centrifugal blower assembly 218 adapted to cause a flow of air through the apparatus to dissipate heat which originates therein. The eddy-current torque resisting means 207 corresponds with the equivalent apparatus indicated at 4 in Fig. 1 and at 135 in Fig. 2.

While in the apparatus above described there is a counter-loading of the motor and hence a dissipation of energy in all except the full speed operating conditions of the motor the loss of efficiency occasioned thereby may well be tolerated in view of the improved regulation of speed of the motor.

We are aware that others have heretofore attempted to improve the speed load characteristics of alternating current machinery through torque resisting or dragging means but these have all involved or depended upon mechanical friction devices together with means responsive to motor conditions for regulating the engagement pressures thereof. Such an apparatus suffers the disadvantage of wide fluctuation of friction coefficients due to fluctuation in temperature, degree of wear and the presence or absence of lubrication. Through experience it has been found that friction coefficients fluctuate so widely that sufficiently dependable speed-torque relationships for successful operation are not obtainable in this way.

With the apparatus of this invention herein disclosed, characteristics are not dependent in any way upon the engagement of frictional parts. Alterations of temperature produce but a minor effect upon the resulting performance with the result that the apparatus of this invention has a consistent response throughout its normal life. There is thus obtained through comparatively simple, reliable and rugged means speed regulation and control of hoisting equipment with the use of alternating current equipment which compares favorably with that obtained with direct current equipment.

We claim:

1. The combination with an alternating current motor of means adapted to selectively vary the amount of power delivered to said motor, eddy-current torque resisting means mechanically connected with the shaft of said motor including windings adapted upon excitation to give rise to eddy-currents which create a field which resists rotation of said motor, a selectively variable excitation current source for said windings adapted to provide independently of the speed of said motor a plurality of predetermined different substantially constant excitation currents, and interlocking control means coacting with said means for selectively varying the amount of power delivered to said motor and said selectively variable excitation current source adapted to position the same in predetermined coordinated relationship.

2. The combination with a wound rotor alternating current induction motor of means adapted to selectively vary the external resistance of the secondary of said motor, eddy-current torque resisting means mechanically connected with the shaft of said motor including windings adapted upon excitation to give rise to eddy-currents creative of a field which resists rotation of said motor, a selectively variable excitation current source for said windings adapted to provide independently of the speed of said motor a plurality of predetermined different substantially constant excitation currents, and interlocking control means coacting with said means for selectively varying the amount of power delivered to said motor and said selectively variable excitation current source adapted to position the same in predetermined coordinated relationship.

3. The combination comprising a wound rotor alternating current induction motor, external resistance means having a plurality of adjustment taps connected to and adapted to selectively vary the external resistance of the secondary of said motor, eddy-current torque resisting means mechanically connected with the shaft of said motor including windings adapted upon excitation to give rise to eddy-currents which create a field which resists rotation of said motor, means including a tapped resistor adapted to supply excitation current to the windings of said eddy-current torque resisting means in selectively variable amount, and a controller having a plurality of control positions connected to the taps of said motor external resistance and to the taps of said excitation resistor adapted to effect a predetermined selection of excitation current for each pre-determined selection of motor external resistance.

4. In an apparatus adapted to lift and lower an overhauling load the combination comprising a wound rotor alternating current induction motor having a shaft, means adapted to connect an overhauling load to said motor shaft, means adapted to selectively vary the external resistance of the secondary of said motor, eddy-current torque resisting means mechanically connected to said shaft including an excitation winding, a source of current adapted to be connected to the winding of said eddy-current torque resisting means to excite the same, a self excited generator mechanically connected to said motor shaft to be driven thereby, and means rendered operative upon failure of said excitation current source adapted upon such failure to connect the output of said generator to the winding of said eddy-current torque resisting means.

5. In an apparatus adapted to lift and lower an overhauling load the combination comprising a wound rotor alternating current induction motor having a shaft, means adapted to connect an overhauling load to said motor shaft, means adapted to selectively vary the external resistance of the secondary of said motor, eddy-current torque resisting means mechanically connected to said shaft including an excitation winding, a source of current adapted to be connected to said eddy-current torque resisting means to excite the same including means adapted to selectively vary the amount of said current, means adapted to selectively establish simultaneously a pre-determined external resistance for the secondary of said motor and a pre-determined excitation current for said excitation winding of said eddy-current torque resisting means, a self excited generator mechanically connected to said motor shaft to be driven thereby, and means rendered operative upon failure of said excitation current source adapted on such failure to connect the output of said generator to the winding of said eddy-current torque resisting means.

6. In an electrically driven hoist the combination comprising a motor; a hoisting drum connected to said motor to be driven thereby; an electro-magnetically released brake connected to said motor and drum and adapted to hold the same against movement at all times except when power is delivered to said motor; a source of power for said motor including a controller having a plurality of hoisting and lowering positions and an off position; an emergency load restraining means including an electro-magnetically excitable eddy current torque resisting means and a source of current independent of said source of power for said motor for exciting the same; and power failure means independent of said controller adapted upon failure of said power source to form a connection between said source of current independent of said source of power and said eddy current torque resisting means to excite the same upon movement of said drum, whereby restraint of a descending load is provided in all positions of said controller whenever failure of said motor power source and said brake occur simultaneously.

7. That form of the combination defined by claim 6 in which the source of current independent of the source of power for said motor comprises a generator mounted to be driven when the drum is in motion.

8. In an alternating current driven hoist an alternating current motor, a source of power for the same, a hoisting drum mounted in driven relationship to said motor, an eddy current torque resisting means connected to said motor to be driven thereby and including a winding adapted on excitation to give rise to eddy currents which create a field which resists rotation of said motor, a source of excitation current for said winding joined in curcuit therewith and including a rectifier adapted to be supplied with current from said source of current for said motor, a current relay having a coil contained within said circuit joining said rectifier and the winding of said eddy current torque resisting means and having contacts which are separated when said coil is energized, a generator connected to said motor to be driven thereby, and a power failure relay having a coil connected in circuit with said generator and the contacts of said current relay adapted to be energized when said generator is being driven and the contacts of said current relay are closed, said power failure relay including contacts which are separated when the coil thereof is not energized and adapted on closure to join said generator in circuit with the winding of said eddy current torque resisting means and contacts which are closed when the coil thereof is not energized adapted upon opening to interrupt the circuit joining said rectifier with the winding of said eddy current torque resisting means.

9. The combination with an alternating current motor of an eddy-current torque resisting means mounted in driven relationship to the shaft of said motor, said eddy-current torque resisting means including windings adapted on excitation to give rise to eddy-currents which create a field which resists rotation of said motor, and a source of excitation current for said windings comprising a rectifier and generator driven by the motor the same being alternatively available for use.

10. The combination with an alternating current motor of an eddy-current torque resisting means mounted in driven relationship to the shaft of said motor, said eddy-current torque resisting means including windings adapted upon excitation to give rise to eddy-currents which create a field which resists rotation of said motor, and a source of excitation current for said windings comprising a rectifier and an accumulator adapted to be charged by said rectifier, said rectifier and said accumulator being alternatively available for use.

11. The combination comprising a wound rotor alternating current induction motor, adjustable external resistance means having a plurality of adjustment positions connected to and adapted to selectively vary the external resistance of the secondary of said motor, eddy-current torque resisting means mechanically connected with the shaft of said motor including windings adapted upon excitation to give rise to eddy-currents which create a field which resists rotation of said motor, excitation current supply means including adjustable current limiting means adapted to supply excitation current to the windings of said eddy-current torque resisting means in selectively variable amount, and control means having a plurality of control positions connected to said adjustable external resistance of said motor and to the adjustable current limiting means of said excitation current supply adapted to effect a predetermined selection of excitation current for each predetermined selection of motor external resistance.

12. The combination comprising a wound rotor induction motor; external resistance means having a plurality of adjustment positions connected to and adapted to selectively vary the external resistance of the secondary of said motor; power regulating means operative to alter the adjustment position of said external resistance means; eddy-current torque resisting means mechanically connected with the shaft of said motor including windings adapted on excitation to give rise to eddy-currents which create a field which resists rotation of said motor; an excitation current supply circuit for the windings of said eddy-current torque resisting means adapted to be connected to a substantially constant potential source of current supply, including adjustable current limiting means having a plurality of adjustment positions each adapted to supply said windings with a different, substantially constant, predetermined, excitation current; resisting torque regulating means operative to alter the adjustment position of said excitation current supply circuit; and control means shiftable to a plurality of adjustment positions connected to said power regulating means and to said resisting torque regulating means to move the same in coordinated relationship to provide simultaneously for each position of adjustment of said control means, a predetermined position of adjustment of said power regulating means and a predetermined position of adjustment of said excitation current supply circuit, to provide a predetermined selection of excitation current for each predetermined selection of motor external resistance.

FRANK W. WENDELBURG.
ERWIN C. BREKELBAUM.

REFERENCES CITED

The following references are of record in the file of this patent.

UNITED STATES PATENTS

| Number | Name | Date |
|---|---|---|
| 2,151,734 | Bouton et al. | Mar. 28, 1939 |
| 2,437,996 | Carnegie et al. | Mar. 16, 1948 |